US006407143B1

(12) United States Patent
Even et al.

(10) Patent No.: US 6,407,143 B1
(45) Date of Patent: *Jun. 18, 2002

(54) METHOD AND SOLVENT COMPOSITION FOR REGENERATING AN ION EXCHANGE RESIN

(75) Inventors: William R. Even; David J. Irvin; Jennifer A. Irvin; Edward E. Tarver, all of Livermore, CA (US); Gilbert M. Brown, Knoxville, TN (US); James C. F. Wang, Livermore, CA (US)

(73) Assignee: Sandia Corporation, Livermore, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/469,573

(22) Filed: Dec. 22, 1999

(51) Int. Cl.[7] .................................................. C08J 5/20
(52) U.S. Cl. .............................. 521/26; 521/28; 521/31
(58) Field of Search ................................ 521/26, 28, 31

(56) References Cited

U.S. PATENT DOCUMENTS

| | | | | |
|---|---|---|---|---|
| 4,124,528 | A | 11/1978 | Modell et al. | ............... 219/364 |
| 4,218,491 | A | 8/1980 | Laws et al. | ............... 19/121.63 |
| 4,601,906 | A | 7/1986 | Schindler | ............... 219/121.47 |
| 4,675,198 | A | 6/1987 | Sevenants et al. | ..... 219/121.47 |
| 5,013,366 | A | 5/1991 | Jackson | ................. 219/121 LF |
| 5,789,505 | A | * | 8/1998 | Wilkinson et al. .......... 526/209 |

OTHER PUBLICATIONS

"Butterworth–Heinemann Series in Chemical Engineering", 1995 "Supercritical Fluid Extraction", 2–nd Edition, McHugh et al.*

"CRC Critical Reviews in Environmental Control", vol. 15, Issue 3, 1985, pp 237–274, Frank Groves et al.*

Fernandez, P.; Alder, A.; Suter, M. Giger, W.; "Determination of the Quanternary Ammonium Surfactant Ditallowdimethylammonium in Digested Sludges and Marine Sediments by Supercritical Fluid Extraction and Liquid Chromatography with Postcolumn Ion–Pair Formation" Analytical Chemistry, v. 68(5), (1996) pp. 921–929.

Hawthorne, S.; Miller, D.; Nivens, D.: White, D.; "Supercritical Fluid Extraction of Polar Analytes Using in Situ Chemical Derivatization" Analytical Chemistry, v. 64(24), (1992) pp. 405–412.

Field, J.; Miller, D; Field, T.; Hawthorne, S.; Giger, W.: "Quantitative Determination of Sulfonated Aliphatic and Aromatic Surfactants in Sewage Sludge by Ion–Pair/Supercritical Fluid Extraction and Derivatization Gas Chromatography/Mass Spectrometry" Analytical Chemistry, v. 64(24), (1992) pp. 3161–3167.

Hawthorne, S.; Miller, D.; Walker, D.; Whittington, D.; Moore, B.: "Quantitative extraction of linear alkylbenzenesulfonates using supercritical carbon dioxide and a simple device for adding modifiers" Journal of Chromatography, v. 451, (1991) pp. 185–194.

Eksborg, S.; Schill, G.: "ion Pair Chromatography of Organic Ammonium Compounds" Analytical Chemistry, v. 45(12), (1973) pp. 2092–2100.

Urbansky, E.D; "Perchlorate chemistry: Implications for analysis and remediation," Bioremed. J. v. 2(2), (1998) pp. 81–95.

Gu, B.; Clausen, J.L.; McDonald, J.A.; McCarthy, J.F.; "Assessment of the Influences of Groundwater Colloids on the migration of Technetium–99 at the Paducah Gaseous Diffusion Plant Site in Paducah, Kentucky," Oak Ridge National Laboratory Report ORNL/TM–12747, 1994.

Gu, B.; Dowlen, K.E.; "An Investigation of Groundwater Organics, Soil Minerals, and Activated Carbon on the Complexation, Adsorption, and Separation of Technetium–99," Oak Ridge National Laboratory Report ORNL/TM–13154, 1996.

Brown, G.M.; Bates, L.M.; Bonnesen, P.V.; Moyer, B.A.; Alexandratos, S.D.; Hussain, L.A.; Patel, V.; Gu, B.; Liang, L.; Siegrist, R.L.; "Sorption of Tc from Contaminated Groundwater on Resins FY 1996 Letter Report,"; Oak Ridge National Laboratory Report ORNL/M–5088, 1996.

Brown, G.M.; Presley, D.J.; Bonnesen, P.V.; Bates, L.M.; Moyer, B.A.; Alexandratos, S.D.; Patel, V.; Gu, B.; Liang, L.; Siegrist, R.L.; "Resins for Selective Sorption of Technetium from Groundwater FY 1996 Letter Report,"; Oak Ridge National Laboratory Report ORNL/M–5480, 1996.

Brown, G.M.; Bates, L.M.; Bonnesen, P.V.; Moyer, B.A.; Alexandratos, S.D.; Hussain, L.A.; Patel, V.; Gu, B.; Liang, L.; Siegrist, R.L.; "Selective Resin for Sorption of Technetium from Groundwater, FY 1995 Letter Report," Oak Ridge National Laboratory Report ORNL/FPO–95/38, 1995.

Brown, G.M.; Presley, D.J.; Bonnesen, P.V.; Bates, L.M.; Moyer, B.A.; Alexandratos, S.D.; Hassain, L.A.; Patel, V.; Gu, B.; Liang, L.; Siegrist, R.L.; "Column Tests of Resins for Selective Sorption of Technectium from Groundwater,"; Oak Ridge National Laboratory Report ORNL/M–5508, 1996.

(List continued on next page.)

Primary Examiner—David W. Wu
Assistant Examiner—Tanya Zalukaeva
(74) Attorney, Agent, or Firm—T. P. Evans

(57) ABSTRACT

A method and composition for removing perchlorate from a highly selective ion exchange resin is disclosed. The disclosed approach comprises treating the resin in a solution of super critical or liquid carbon dioxide and one or more quaternary ammonium chloride surfactant compounds.

37 Claims, 8 Drawing Sheets

OTHER PUBLICATIONS

Brown, G.M.; Presley, D.J.; Bonnesen, P.V.; Bates, L.M.; Moyer, B.A.; Alexandratos, L.A.; Patel, V.; Ober, R.; Gu, B.; Liang, L.; Siegrist, R.L.; "Column Tests of Resins for Selective Sorption of Technetium from Groundwater: FY 1997 Summary Report,"; Oak Ridge National Laboratory Report ORNL/M-5920, 1997.

Hannay, J.B.; Hogarth, J.; "On the Solubility of Solids in Gases," J. Proc. Roy. Soc. (London), v.29 1897, p. 324–327.

Francis, A.W., "Ternary Systems of Liquid Carbon Dioxide," J. Phys. Chem., v. 58, (1954) pp. 1099–1114.

Springston, S.R.; Novotny, M.; "Kinetic Optimization of Capilliary Supercritical Chromatography using Carbon Dioxide as the Mobile Phase", Chromatographia, v. 14 (12) Dec. 1981, pp. 679–684.

* cited by examiner

FIG. 1

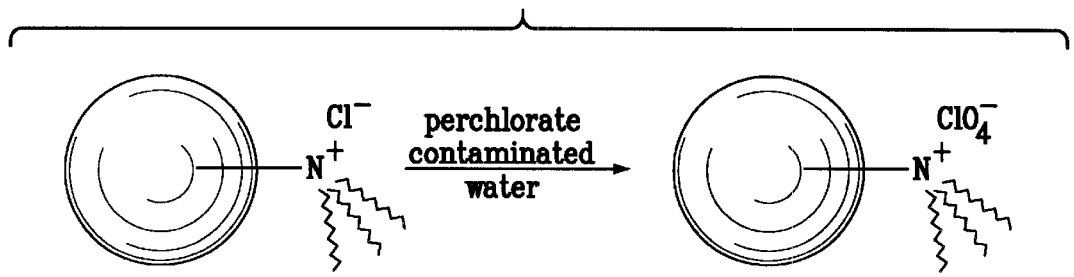

Step One: Clean Resin-chloride is exposed the perchlorate-contaminated water, yielding resin-perchlorate and purified water

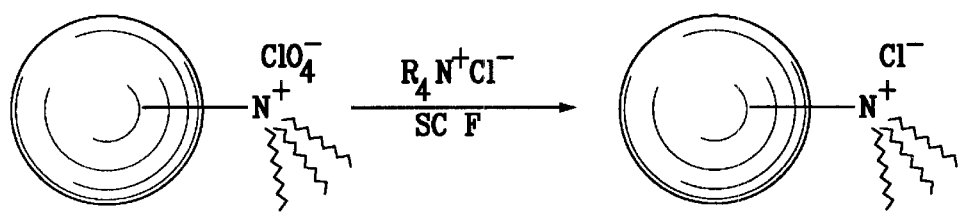

Step Two: Resin-perchlorate is exposed to an organic ammonium chloride in a supercritical fluid, yielding resin-chloride and an organic ammonium perchlorate

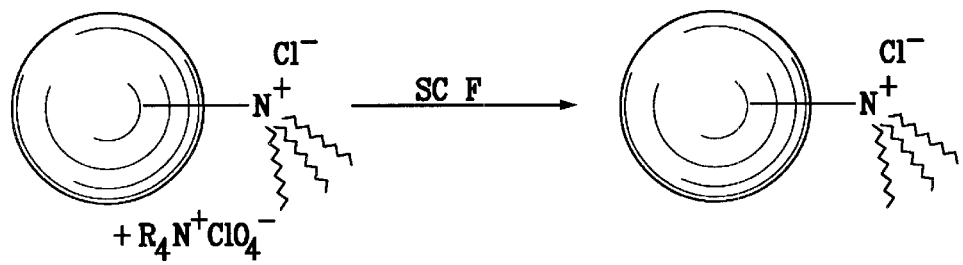

Step Three: Resin-chloride is washed with supercritical fluid to remove organic ammonium perchlorate, yielding clean resin-chloride to be re-used

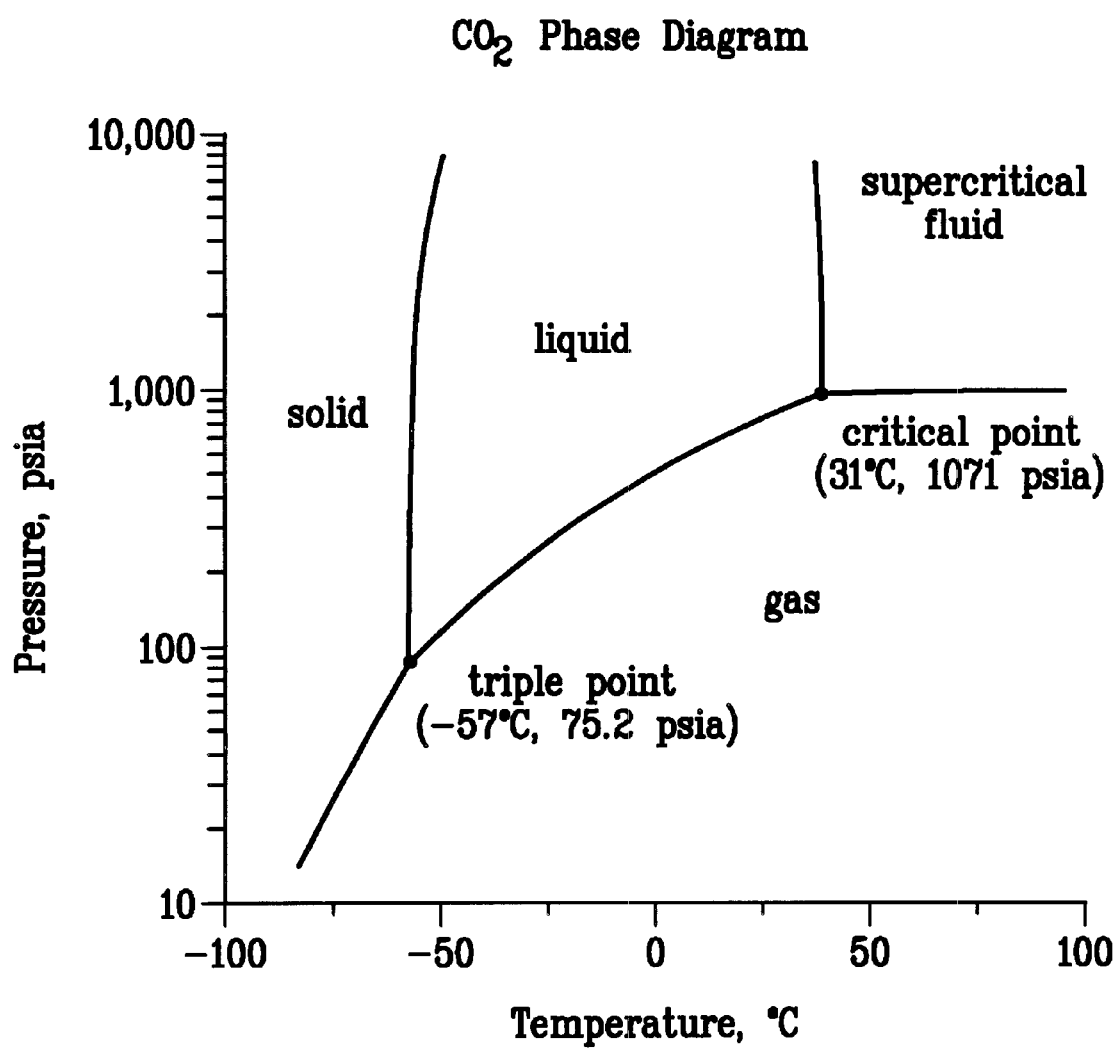

Aqueous, Bulk Regeneration Proof-of-Concept

Proof of concept demonstrated with perrhenate. Process confirmed for perchlorate
*times/concentrations/volumes not optimized SCO2, Bulk Regeneration Proof-of-Concept Proof of concept demonstrated with perrhenate. Process confirmed for perchlorate
*times/concentrations/volumes not optimized

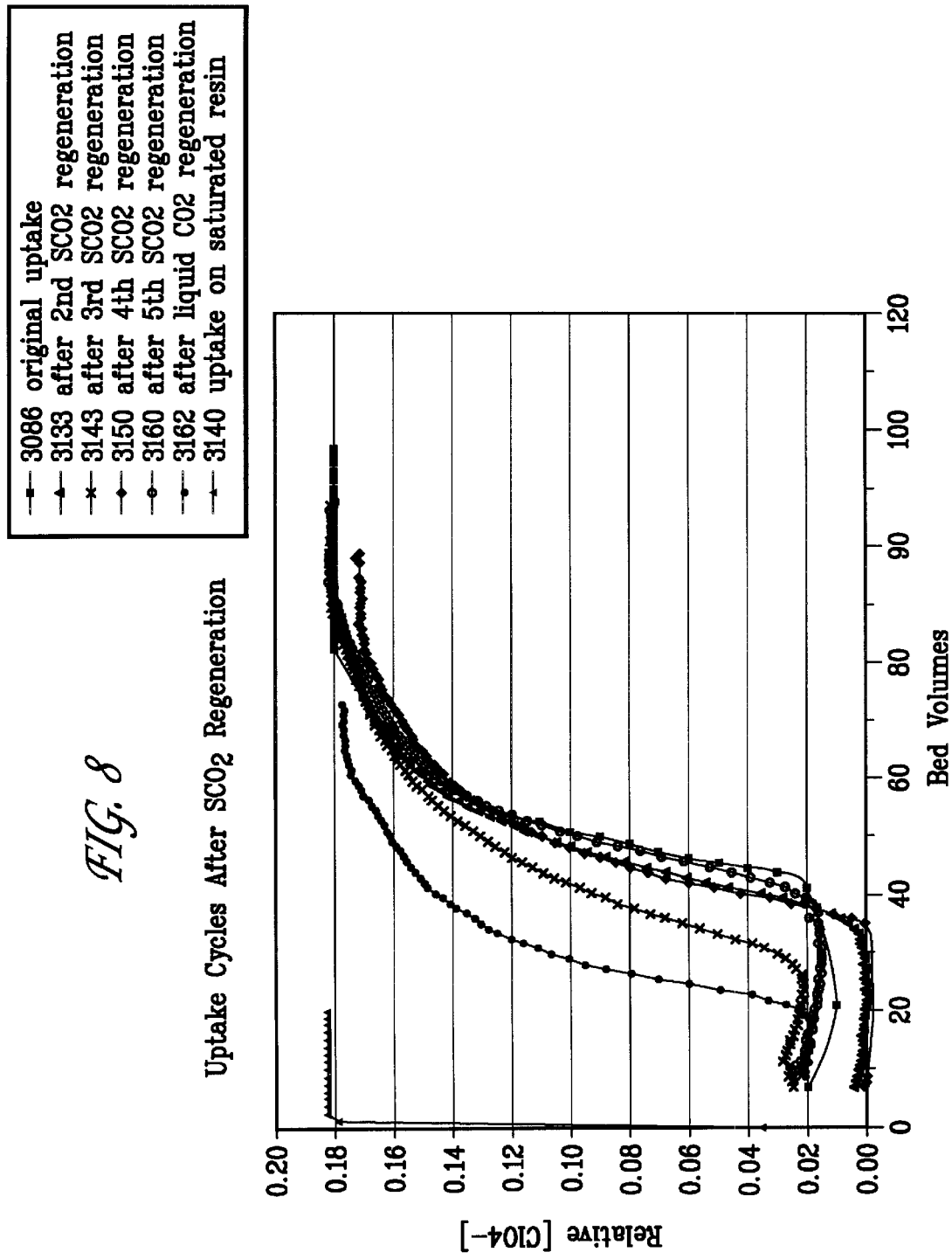

METHOD AND SOLVENT COMPOSITION FOR REGENERATING AN ION EXCHANGE RESIN

The United States Government has rights in this invention pursuant to Contract No. DE-AC04-94AL85000 between the United States Department of Energy and the Sandia Corporation for operation of the Sandia National Laboratories and Contract No. DE-AC05-96OR22464 between the U.S. Department of Energy and Lockheed Martin Energy Research Corporation for the operation of the Oak Ridge National Laboratory.

BACKGROUND OF THE INVENTION

1. Field of the Invention

The present invention relates, generally, to a method for treating and regenerating a spent polymeric ion exchange resin. In particular, the present invention relates to a method for removing unwanted impurities from ion exchange resins in a safe, and environmentally responsible manner and more particularly to a method for regenerating the ion exchange resin which has been saturated with large, poorly hydrated anions, particularly perchlorate ($ClO_4^-$) anions. The disclosed method is, however, generally applicable to many other similar species such as rhenates ($ReO_4^-$), arsenates ($AsO_2^-$), tungstenates ($WO_4^-$), pertechnetates ($TcO_4^-$) and the like.

2. State of the Art

Perchlorate-based propellants are widely used in both civilian and government operations, typically mining, demolition, and aerospace applications subsequently large volumes of perchlorate-containing compounds have been disposed of in the environment since the 1950s. Past methods for grossly disposing of these materials have consisted largely of open-air burning, detonation or simply aqueous dissolution. The perchlorate ($ClO_4^-$) anion, therefore, has origins as a contaminant introduced into the environment from the uncontrolled disposal of the solid salts of ammonium, potassium, or sodium perchlorate. Unfortunately, these salts are very soluble in water and have been found to be chemically inert in many natural redox reactions and non-complexing in their interactions with typical metal ions found in the environment. These properties make the perchlorate ion exceedingly mobile in subsurface soil environments and allow it to persist for many decades under typical groundwater and surface water conditions. The presence of this material in the environment poses a potential threat to ecological receptors and the public.

The California Department of Health Services has proposed setting an action level of 18 μg/L (ppb) for perchlorate in groundwater, a level only recently analytically detectable. Drinking water wells owned by the city of Redlands, in Riverside County California are facing increasing intrusion of perchlorate from a known plume of perchlorate contamination in the local aquifer. Treatment technologies capable of specifically removing very low levels of $ClO_4^-$ (~50 ppb) from groundwater are, therefore, urgently needed.

Water utilities, in particular, need treatment methods that can reliably reduce $ClO_4^-$ concentrations to low or non-detectable levels. $ClO_4^-$ ions are nonvolatile and highly soluble in water, and cannot be removed by conventional filtration, sedimentation, or air-stripping methodologies. To be useful, a drinking-water treatment method must be cost effective, acceptable to regulatory agencies and the public, and generate a minimum amount of secondary waste. In addition, a treatment method must not be adversely affected by other naturally occurring components in the water and it must not contribute to other water quality or distribution system problems. Urbansky, E. D., "Perchlorate chemistry: Implications for analysis and remediation," Bioremed. J. (2), pp. 81–95 (1998) has outlined some candidate treatment technologies and pointed out the drawbacks of each. Membrane-based technologies, such as reverse osmosis, were thought impractical as were conventional, non-specific anion exchange resins. The cationic chemical nitron precipitates perchlorate efficiently and might be suitable for remediation of high concentrations of perchlorate. However, the cost and waste disposal issues render this technology unacceptable. Given the chemical inertness of $ClO_4^-$ to reduction reactions and the small concentrations involved, it seems clear that chemical reduction is not feasible. Bioremediation methods appear to be the most economical and technically feasible remediation methods at the moment. However, a method based on live bacteria and added nutrient gradients is unlikely to be embraced by government, industry, and water utilities. Furthermore, current biological processes are time intensive, batch methods while the current need is for in-line wellhead amenable technology.

Highly selective anion exchange resins offer considerable advantages over conventional (non-selective) resins in, the treatment of perchlorate contaminated groundwater. The Oak Ridge National Laboratory (ORNL) has developed anion-exchange resins that have a bias for the sorption of large poorly hydrated anions such as pertechnetate ($TcO_4^-$) and perchlorate ($ClO_4^-$) anions from contaminated groundwater (Brown et al., 1995; Brown et al., 1997; Brown et al., 1996). Highly selective bifunctional anion-exchange resins were developed in U.S. Department of Energy (DOE) sponsored work for the sorption of $TcO_4^-$ from contaminated groundwater at the Paducah Gaseous Diffusion Plant site, Kentucky (Gu, et al., 1998). Groundwater at several DOE sites is contaminated with the radionuclide Tc-99 which exists in the chemical form of $TcO_4^-$ anions in oxygenated environments (Gu et al., 1996; Gu and Dowlen, 1996). Pertechnetate, like $ClO_4^-$, is highly mobile in underground aquifers. The concentration of $TcO_4^-$ ion is 4 to 6 orders of magnitude lower than the other anions found in groundwater, such as chloride, sulfate, nitrate, and bicarbonate.

While these highly selective anion exchange resins provide useful service, their manufacture and disposal costs make it imperative that a method be found to regenerate the resin in order that its useful service-life be extended. Regeneration would consist of "washing" the resin in order to remove or "re-exchange" the perchlorate anion with a similar chloride anion source as was present in the virgin resin. Unfortunately, the very properties which make these resins so attractive also make them difficult to recondition in a manner which does not itself generate an environmentally unacceptable waste stream. In particular, because the exchange sites of the spent resin has substantial hydrophobic character, the use of an aqueous regeneration method would be thought to be less effective or impossible, suggesting use of an organic solvent instead. However, since most such solvent materials are themselves a waste hazard which would require remediation and disposal such an approach serves simply to substitute one waste stream for another.

What is needed therefore, is a method for regenerating these highly selective resins in such a way as to return them to an "as-new" condition without exacerbating the remediation problem by introducing an organic solvent waste stream.

SUMMARY OF THE INVENTION

This invention relates generally to a method for regenerating an anion exchange absorbent contaminated with perchlorate ($ClO_4^-$) thereby restoring said resin to a near original condition. More specifically, the present invention relates to a novel method for regenerating a bifunctional anion exchange resin by providing an efficient way for removing the perchlorate anion form the spent resin.

It is therefore an object of this invention to provide a method for removing a tightly bound ion from hydrophobic sites on an organic ion exchange resin medium without the use of a (typically petroleum-based) non-aqueous organic backwash.

Yet another object of the invention is the use of liquid, or supercritical, carbon dioxide as an exchange medium to solvate the perchlorate anion in favor of the quaternary chloride anion and thereby bringing an organic ammonium chloride into close proximity with the perchlorate anion bound at the resin exchange site in order to allow a second exchange reaction to occur.

It is a further object of this invention to provide a method for regenerating an ion exchange resin which includes a non-aqueous backwash wherein the liquid carrier medium is other than an fluid organic hydrocarbon.

It is another object of this invention to provide a method for regenerating an ion exchange resin which includes a supercritical fluid backwash.

Another object of this invention is to provide a solvent composition for removing anions selectively exchanged on said ion exchange resin.

Yet another object of this invention is to provide a solvent composition which includes liquid, or supercritical, carbon dioxide as a carrier medium.

Another object of this invention is to provide a solvent composition which includes supercritical carbon dioxide as the carrier medium.

Yet another object of this invention is to provide a solvent composition which includes a surfactant.

Another object of this invention is to provide a solvent composition which includes one or more surfactants taken from those used in the water treatment industry.

BRIEF DESCRIPTION OF THE DRAWING

FIG. 1 presents a series of schematic cartoons illustrating the continuous resin-regeneration process as a flow diagram.

FIG. 2 illustrates the pressure/temperature phase diagram for carbon dioxide.

FIG. 8 illustrates regeneration cycling results where the carrier fluid is $SCO_2$.

DETAILED DESCRIPTION OF THE INVENTION

Figure 3:
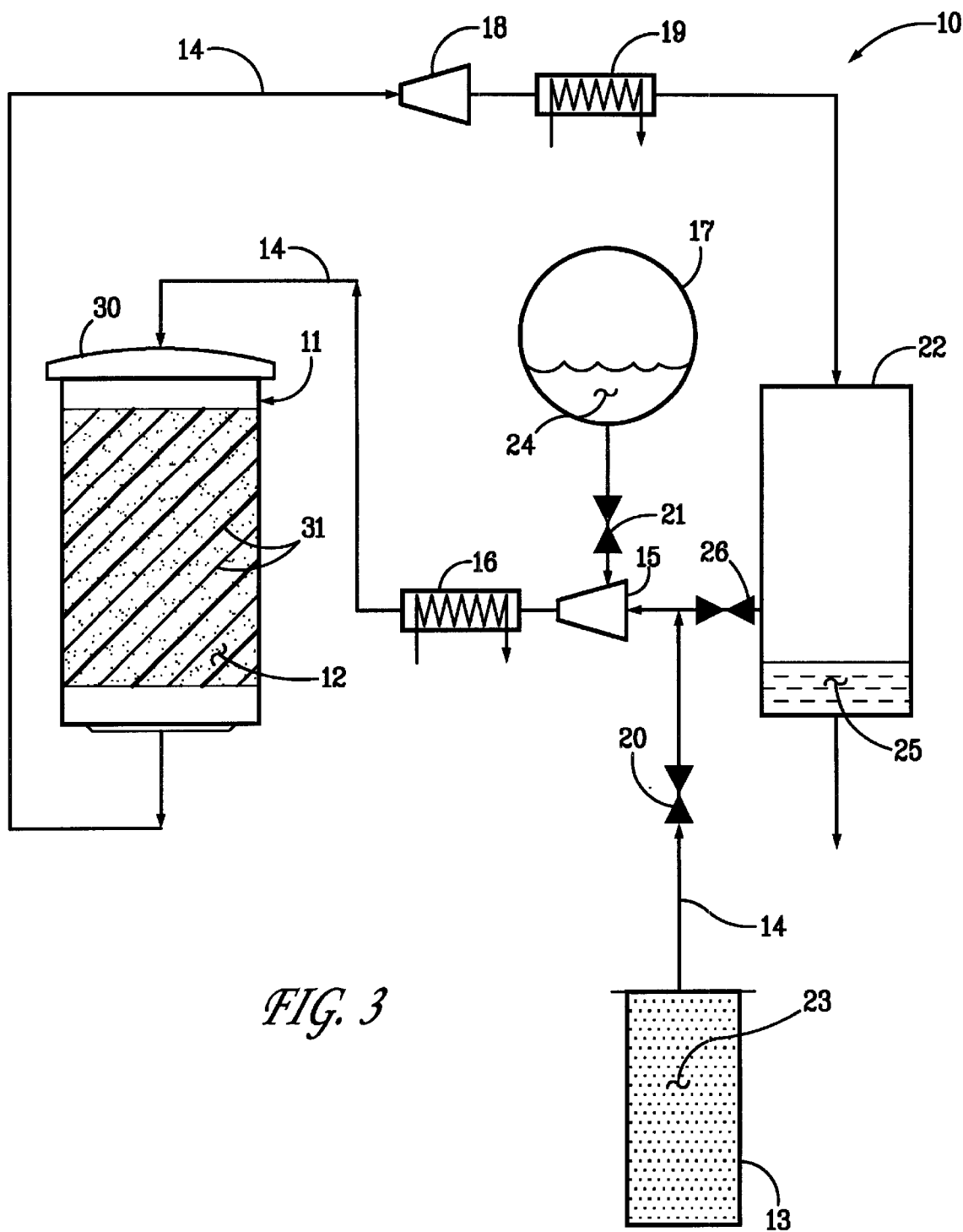
FIG. 3 illustrates the wash process of FIG. 1 modified and deployed as a concurrent cascading column.

Laboratory results indicated that the prototype bifunctional synthetic resins, D-3696 (made by Purolite International) and the experimental resin RO-02-119 (prepared at the University of Tennessee-Knoxville), are highly selective toward $ClO_4^-$ and performed ~5 times better than the best previously available commercial nitrate resin (Purolite® A-520E) and more than an order of magnitude better than some nonselective commercial resins (e.g., Amberlite® IRA-900) for removing perchlorate from an aqueous waste stream. Furthermore, these bifunctional resins were particularly effective in removing trace quantities of $ClO_4^-$ in groundwater to below the detection limit (~3 $\mu$g/L). A field trial, performed at perchlorate concentration levels of about 18 ppb, has demonstrated that the D-3696 resin is able to treat ~110,000 bed volumes of groundwater before a 10% breakthrough (breakthrough is herein defined as the state wherein detectable levels of the targeted anion first pass through the exchange column) of $ClO_4^-$ occurred under the column flow-through conditions (running at ~2 bed volumes per minute). On the other hand, the Purolite® A-520E resin was able to treat ~23,000 bed volumes of groundwater under the same experimental conditions. No pretreatment was needed to remove either dissolved organic matter or other competing anions (such as $SO_4^{2-}$ or $NO_3^-$) in the groundwater, and the treatment process did not alter the water quality by removing or adding secondary by-products because of the high selectivity of the bifunctional resins. The results thus demonstrated that the new bifunctional resin could provide an efficient and cost-effective solution to the removal of $ClO_4^-$ from groundwater because of its reduced cost in operation and maintenance, resin regeneration, and waste disposal.

Unfortunately, as noted above these bifunctional resins are very selective to perchlorate and the resin exchange site is rendered generally hydrophobic once the original $Cl^-$ ion present in the resin is replaced by $ClO_4^-$. This would intuitively suggest that the use of water-based backwash methods for regenerating the resin would be ineffective. As we shall see, however, this in fact does not prove to be the case.

Organic solvent could be used in place of water, and certain reactive metals could be introduced to initiate a redox reaction to destroy the perchlorate. These methods, however, are at once expensive and counter-productive since each simply replaces one waste stream for another. An alternative approach utilizes a technique known in the food-processing arts. Specifically, it is known that supercritical carbon dioxide functions very effectively as a non-aqueous solvent for many materials, particularly those oils found in food products.

Supercritical fluids exhibit unusual characteristics different from certain characteristics exhibited by liquids, solids, or vapors, and these unique characteristics have been exploited in a variety of methods for processing a variety of substances. For example, unlike organic solvents, such as light alkanes (e.g. up to $C_6$–$C_7$), alcohols, ketones, or trichloroethane, supercritical fluids exhibit unique physical properties such as low surface tension, low viscosity, high diffusivity, and variable solute carrying capacity.

Supercritical fluids are used for cleaning or extracting a wide variety of materials and have been known for many years. A supercritical fluid is a dense phase gas which has been compressed to either supercritical or subcritical conditions to achieve liquid-like densities. (The term "supercritical fluid" defines a physical state of a particular species that exists above that particular species' Critical Point. This Critical Point is that point on an equilibrium diagram at the intersection of the critical temperature and critical pressure of the species. The critical temperature of a species is defined by that temperature above which the species cannot exist as a liquid. The pressure that must be applied to cause condensation of the species at the critical temperature is the critical pressure, that is, the critical pressure is the vapor pressure of the species at its critical temperature. Thus, a supercritical fluid is defined as a phase existing above the critical temperature and above the critical pressure of a particular species.)

The solvent properties of compressed gases are well known. In the late 1800's, Hannay and Hogarth found that inorganic salts could be dissolved in supercritical ethanol and ether (J. B. Hannay and H. Hogarth, J. Proc. Roy. Soc. (London), 29, p. 324, 1897). Francis established a large solubility database for liquified carbon dioxide which showed that many organic compounds were completely miscible. (A. W. Francis, J. Phys. Chem., 58, p. 1099, 1954);. In the 1960's there was much research and use of dense phase gases in the area of chromatography. Supercritical fluids (SCF) were used as the mobile phase in separating non volatile chemicals (S. R. Springston and M. Novotny, "Kinetic Optimization of Capillary Supercritical Chromatography using Carbon Dioxide as the Mobile Phase", CHROMATOGRAPHIA, Vol. 14, No. 12, p. 679, December 1981).

Today the environmental risks and costs associated with conventional solvent aided separation processes require industry to develop safer and more cost-effective alternatives. There are several known industrial applications of the use of liquid and/or supercritical carbon dioxide as processing solvents. These applications include the extraction of hops (Laws et al, U.S. Pat. No. 4,218,491, Aug. 19, 1980), the extraction of oils from seeds (B. Schindler, U.S. Pat. No. 4,601,906, Jul. 22, 1986), the decaffination of coffee (S. Katz, U.S. Pat. No. 4,820,573, Apr. 11, 1989), the removal of off-flavor from vegetable products (M. Sevenants, U.S. Pat. No. 4,675,198, Jun. 23, 1987), precision cleaning of intricate parts and assemblies (D. Jackson, U.S. Pat. No. 5,013,366, May 7, 1991 and regenerating absorbents (activated carbon) (M. Modell, U.S. Pat. No. 4,124,528, Nov. 7, 1978).

For many reasons, carbon dioxide is the preferred solvating fluid for this invention. The solvent properties of liquid and supercritical carbon dioxide are well known. Further, in recent years the environmental risks, federal and local regulations and waste disposal costs associated with organic and aqueous solvent separation processes have prompted renewed interest in the use of supercritical and liquid carbon dioxide as processing solvents. Carbon dioxide possesses many of the characteristics desired in an "environmentally acceptable" solvent. It is non-toxic, non-flammable, inexpensive, and abundantly available. It can be continually recycled in a closed loop system so that emissions to the atmosphere are minimal. It possesses excellent solubility characteristics for non-polar organic materials such as oils, greases, and solvents. Both liquid and supercritical carbon dioxide have liquid-like densities that contribute to their good .solvent properties. The densities can be manipulated to particular values by changes in temperature and pressure, thus varying the solute carrying capacity. Both phases have low viscosities and low surface tensions. The critical temperature and pressure of carbon dioxide are 304° K (31° C.) and 1071 psia respectively. Conditions above these critical conditions result in the production of the superfluid phase while (P,T) conditions between about 75 psia and 216° K up to the critical point result in the liquid phase of carbon dioxide. These conditions are easily and routinely achieved in laboratory and production equipment.

A class of commercially available quaternary ammonium chloride compounds has been chosen as the preferred vehicle for exchanging perchlorate ions for chloride ions. These materials were selected due to their similarity to the resin's own chemical structure and their wide use as antimicrobial agents in the industrial water treatment industry. One or more of these compounds will be carried by the liquid $CO_2$ to circulate around the spent resin bed thereby bring the chloride ion of the ammonium salt into contact with the perchlorate ion of the resin. The proposed result is itself a simple exchange process as described below:

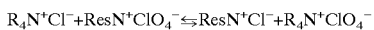

where, Res designates the resin, and where $R_4N^+$ designates the ammonium ligand. The process is further described in a series of schematic cartoons illustrated in FIG. 1.

However, in order to function as an efficient system for regenerating the resin of the present invention, it is essential that the chosen surfactant be selected so as to provide the perchlorate anion with a more stable site on the ammonium salt than on the resin.

It has been found experimentally that the above class of ammonium salts provide this condition.

Embodiment 1

As noted above, a useful fluid for practicing this invention is carbon dioxide. The liquid and/or supercritical carbon dioxide used in accordance with the present invention are obtained from any combination of temperature and pressure consistent with each phase as shown in the phase diagram for carbon dioxide in FIG. 2. Similarly, the gaseous carbon dioxide is obtained from any combination of temperature and pressure consistent with the gaseous phase as shown in FIG. 2. References to particular temperatures and pressures for any given phase of carbon dioxide are intended to be exemplary but not restrictive to that particular combination of temperature and pressure.

A preferred embodiment of this application is drawn to a process and to a unique composition for removing perchlorate anions chemisorbed onto bifunctional sites along a synthetic polymer resin. Those skilled in the art, however, will appreciate that the process disclosed and described in the present invention is not limited to remediation of only the perchlorate anion but is equally applicable where the affinity between a target ion and the reaction sites on an exchange resin are high. Examples of such ions are pertechnetates, rhenates, arsenates, tungstenates, and the like.

FIG. 3 illustrates a flow diagram of a suitable closed loop system which could be deployed for regenerating the synthetic resin in accordance with the present invention. Perchlorate-laden resin 12 contained within water treatment column 11 would constitute a treatment system 10. Alternatively, the spent resin bed could be removed and treated remotely. (While this latter approach is indeed a legitimate option, it tends to require unnecessary and expensive handling.)

A simple embodiment of this approach is dealt with as follows. System 10 is envisioned to be made up of treatment column 11, resin 12, compressor 15, heaters 16 and 19, connecting lines 14, expansion throttle 18, isolation valves 20 and 21, and separation vessel 22, and would operate in the following manner. A bank of gas cylinders 13 containing compressed carbon dioxide 23 are connected to column 11 and eventually to expansion throttle 18 through a series of fluid transport lines 14. Liquid carbon dioxide 23 is introduced into system 10 and is pressurized and heated by compressor 15 and heater 16, respectively. Concurrent with the introduction of the liquid carbon dioxide 23 into compressor 15 is the introduction of one or more surfactant liquids 24, which are continuously fed into the stream of liquid carbon dioxide 23 from reservoir, 17 where they are at once mixed and compressed. The purpose for introducing surfactants 24 into the reactor system is to "wet" synthetic resin 12 and allow exchange of the resin-captured perchlorate ion with the ammonium chloride ion. (Ancillary co-solvents, such as ethanol, have been found experimentally to improve the rate of anion exchange).

Liquid surfactants 24 are any of a number of a family of quaternary ammonium chlorides which are commercially available and widely used in the water treatment industry. Examples of these materials are benzyl dimethyl ammonium chloride, (Aliquat 336, CAS Reg. No. 5137-55-3); dideclyl dimethyl ammonium chloride (CAS Reg. No 7173-51-5); n-alkyl(60% $C_{14}$, 25% $C_{12}$, 15% $C_{16}$)dimethyl benzyl ammonium chloride (CAS Reg. No 68424-85-1); n-alkyl (60% $C_{14}$, 30% $C_{16}$, 5% $C_{12}$, 5% $C_{18}$)dimethyl benzyl ammonium chloride (CAS Reg. No 68391-01-5); n-alkyl (68% $C_{12}$, 32% $C_{14}$)dimethyl ethbenzyl ammonium chloride (CAS Reg. No 68956-79-6); n-dialkyl(60% $C_{14}$, 30% $C_{16}$, 5% $C_{12}$, 5% $C_{18}$)methyl benzyl ammonium chloride (CAS Reg. No 68391-05-9); and combinations of two or more of any of these materials.

Once system 10 is charged and pressurized with carbon dioxide 23, isolation valve 20 can be shut off. Carbon dioxide flow is established from compressor 15, through its associated heater 16, through treatment column 1, through the expansion throttle 18 and its associated heater 19, and into a separation vessel 22 where perchlorate laden liquid surfactant collects for disposal to the compressor 15 for another cycle. Adjustments to the compressor speed, expansion throttle 18, and the temperature of the two heaters 16 and 19 allows the treatment column 11 and vessel 22 to be maintained any desired operational condition of temperature and pressure. Such adjustments may be part of commercially available servo feed-back control systems (not shown).

In treatment column 11, the desired temperature and pressure for solvency of perchlorate in the liquid or supercritical carbon dioxide 23 is typically between about 1000 to about 2000 psia and from about 20° C. to about 50° C. The liquid or supercritical carbon dioxidelsurfactant continuously enters the top of treatment column 11 and flows down through the perchlorate-laden synthetic resin 12. Flow is adjusted to provide sufficient residency time for the exchange of perchlorate/chloride to proceed flushing the perchlorate-laden liquor 25 away from synthetic resin 12. The perchlorate-solvent liquor continuously exits through the bottom of treatment column 11, flows through expansion throttle 18 and heater 19 and thus into separation vessel 22. Throttle 18 and heater 19 are set such that the carbon dioxide entering the separator vessel 22 has boiled off of the liquor as entered the gaseous phase (see FIG. 2); typically pressures below about 400 psai to 500 psia and temperatures of about 25° C. to 35° C. Under these conditions, the liquor is composed almost entirely of the surfactant 24, additional ancillary co-solvents used, and the perchlorate carrier species, $CO_2$ having negligible solubility in the discharged liquor which collects in the bottom of separator vessel 22. The evaporated carbon dioxide gas is now recycled by passing through compressor 15 wherein the pressure is raised equal to or greater than that of the column 11. The temperature of the carbon dioxide is adjusted to the desired value as it flows through heater 16, where it reenters the column 11 as either liquid or supercritical carbon dioxide to again exchange and flush away perchlorate from the synthetic resin 12. Recirculation of the carbon dioxide 23 is continued in this manner until all of the perchlorate has been removed from the synthetic resin and deposited in the separator vessel 22. When the separation of the perchlorate from synthetic resin 12 is complete, water treatment column 11, now containing perchlorate-free synthetic resin is re-plumbed for further groundwater remediation. In no case, however, should the resin media be allowed to dry out once the surfactant is washed from the media. Allowing the resin beads to dry limits the media capacity for further perchlorate uptake.

Recovered perchlorate-laden surfactant liquor 25 then could be drained from the separator vessel 22 where it would be disposed of as a bulk liquid (burned as a fuel, for instance) or further separated to remove and recycle the liquid surfactant 24. Such separation might be accomplished by simple chemical precipitation to yield solid perchlorate which may now be dried and disposed of as a solid waste.

The feasibility of the flow-through regeneration approach was tested as follows:

Supercritical $CO_2$ flow-through regeneration experiments are conducted by pumping a known volume of a surfactant solution over a quantity of resin. A known amount of surfactant is dissolved in ethanol as a solution modifier, and the surfactant solution is mixed with supercritical $CO_2$ (15% modified solution, 85% $CO_2$.) The mixture is then pumped through a column containing the perchlorate-contaminated resin.

After treating the contaminated resin regeneration, the column is washed with ethanol and water to remove residual surfactant and to wet the resin column prior to again filtering perchlorate laden waste through the resin column. Regeneration efficiency was determined by a comparison of the volume of waste passed through the column until breakthrough is detected in each of several successive uptake trials against the initial quantity of waste passed through fresh resin.

Alternatively, the same approach was demonstrated using a simpler liquid-phase flow-through technique. Liquid-phase flow-through regeneration experiments are conducted in much the same way as the foregoing process using supercritical carbon dioxide. Again a known volume of a surfactant solution (0.17M in 75% ethanol, 25% water) is pumped through a column containing the perchlorate-contaminated resin. After the desired volume is pumped through the column, the column is washed with water to remove residual surfactant. Regeneration efficiency is determined as before.

Figure 6:
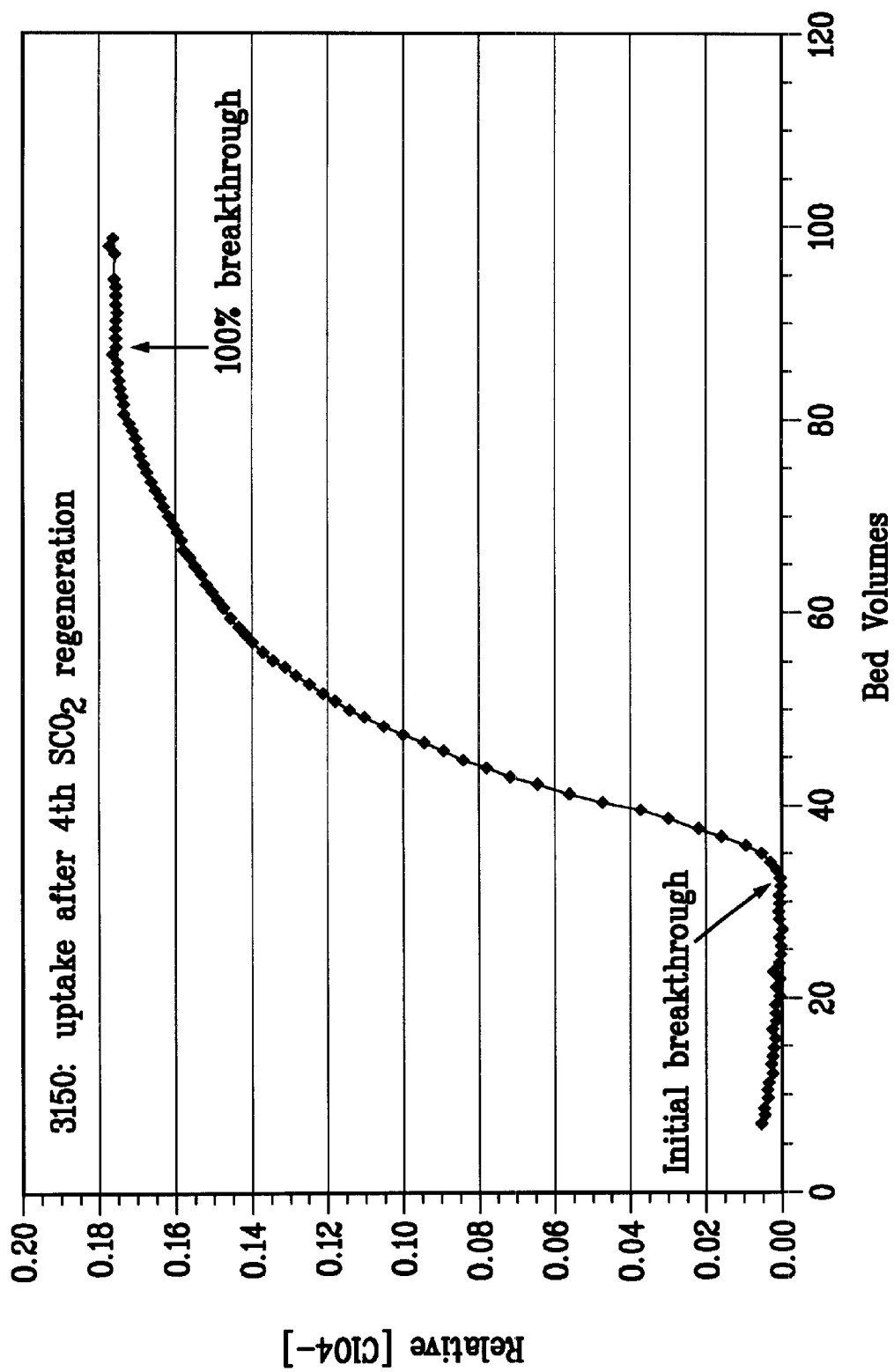
FIG. 6 shows an uptake experiment illustrating the point of "breakthrough."

In both flow-through cases, perchlorate uptake was monitored throughout with the use of a perchlorate Ion Selective Electrode (ISE) arranged in a monitoring cell between the column and the fraction collector. While the ISE gives only relative perchlorate concentrations, it is a useful tool for monitoring changes in perchlorate levels throughout an uptake experiment. Bed volumes-to-initial, and 100% breakthrough are easily determined as illustrated in FIG. 6. Relative uptake, measured as mg $ClO_4^-$/g resin at initial breakthrough is then calculated for comparison purposes. The graphs generated from the ISE data are used to determine which samples will be analyzed further. Ion chromatography is used on the fraction collected samples to determine actual perchlorate concentrations for determination of regeneration efficiencies.

Embodiment 2

Alternatively, another approach to regenerating a bifunctional resin which has strongly bound a target anion at its active sites comprises a batch-wise aqueous wash and rinse.

As noted above this approach would be thought to be ineffective due to the nature of the spent media. This has not proven to be the case, however.

Figure 4:
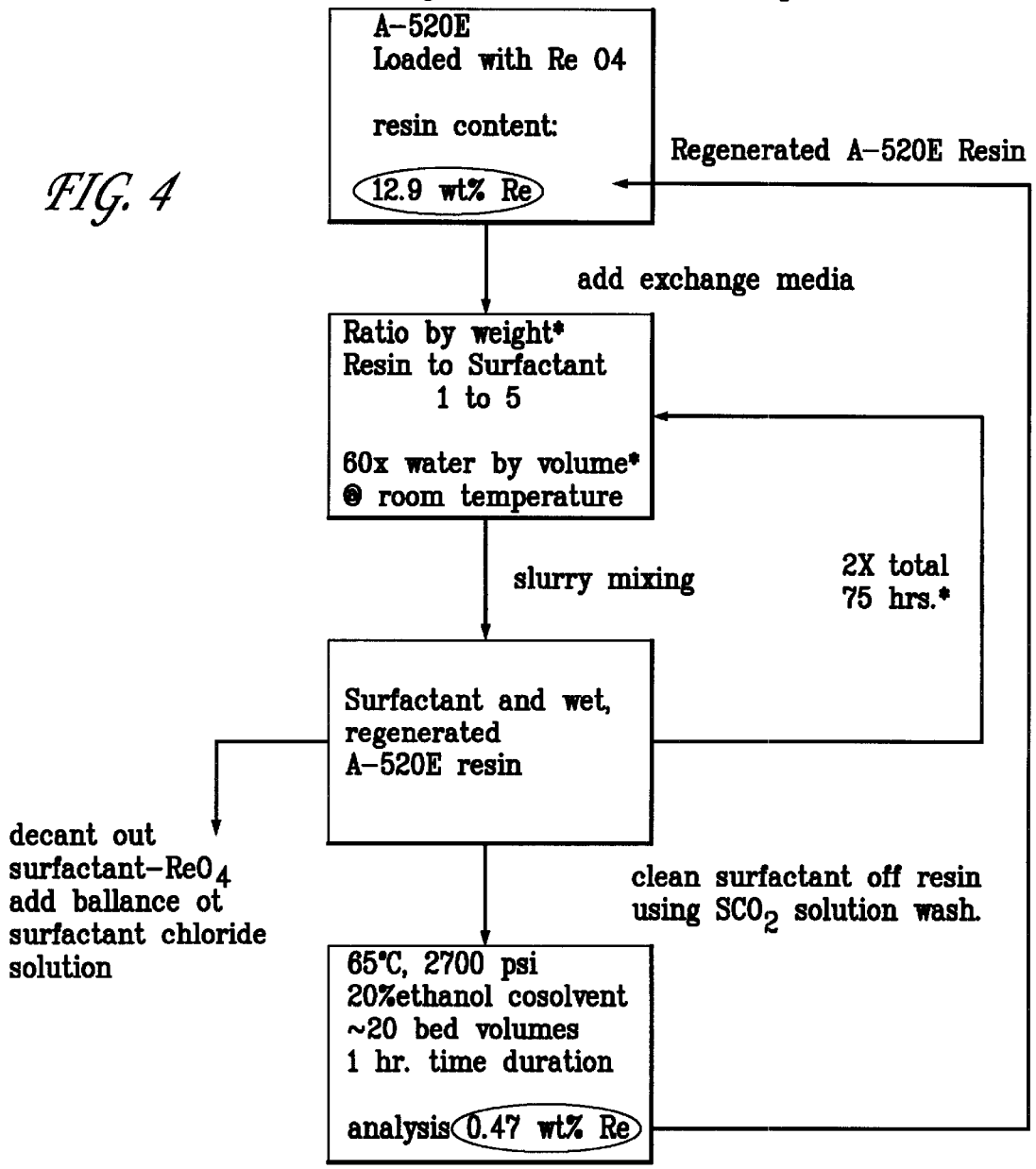
FIG. 4 illustrates a batch circulating aqueous wash process for removing perchlorate from the resins used in the present invention.

As shown in FIG. 4, a block quantities of "spent" synthetic resin 12 is introduced into, and allowed to circulate within, a reservoir containing a solution of water and surfactant 24 at room temperature. This step is allowed to proceed for periods of up to 24 hours (it was found experimentally that approximately 96% regeneration was achieved in 4 hours), at which point the circulating liquid is decanted and a quantity of fresh solution introduced. The step of washing is then repeated for the same period of time.

The process may continue in this way indefinitely, although it is found experimentally that greater than 97% perchlorate removal can be achieved depending upon the choice of surfactant used after only two cycles. It was also found that out of the collection of alkammonium chlorides for the present invention the surfactant BTC1010 (didecyl dimethyl ammonium chloride, CAS Reg. No 7173-51-5) produced the most efficient perchlorate removal rate. Parameters were not optimized, however, a ratio of resin to surfactant of 1:5, and a volume of water equivalent to about 60 times the volume of the resin/surfactant mixture performed well.

The batch reactor of this embodiment also may be modified to function as a cascading column with concurrent flow. As shown in FIG. 3 the spent resin 12 enters into the top of column 30 and slowly descends though a series of baffle steps 31. These steps act to slow the progress of the resin through the column and simultaneously stir the individual resin "beads" thereby exposing each to the greatest amount of surfactant solution. Gravity, and the movement and weight of the entering beads, drives the resin down through the column. The rate of resin decent is adjusted with the rate of movement of the surfactant solution until a steady-state flow of resin and solution is established.

Embodiment 3

Figure 5:
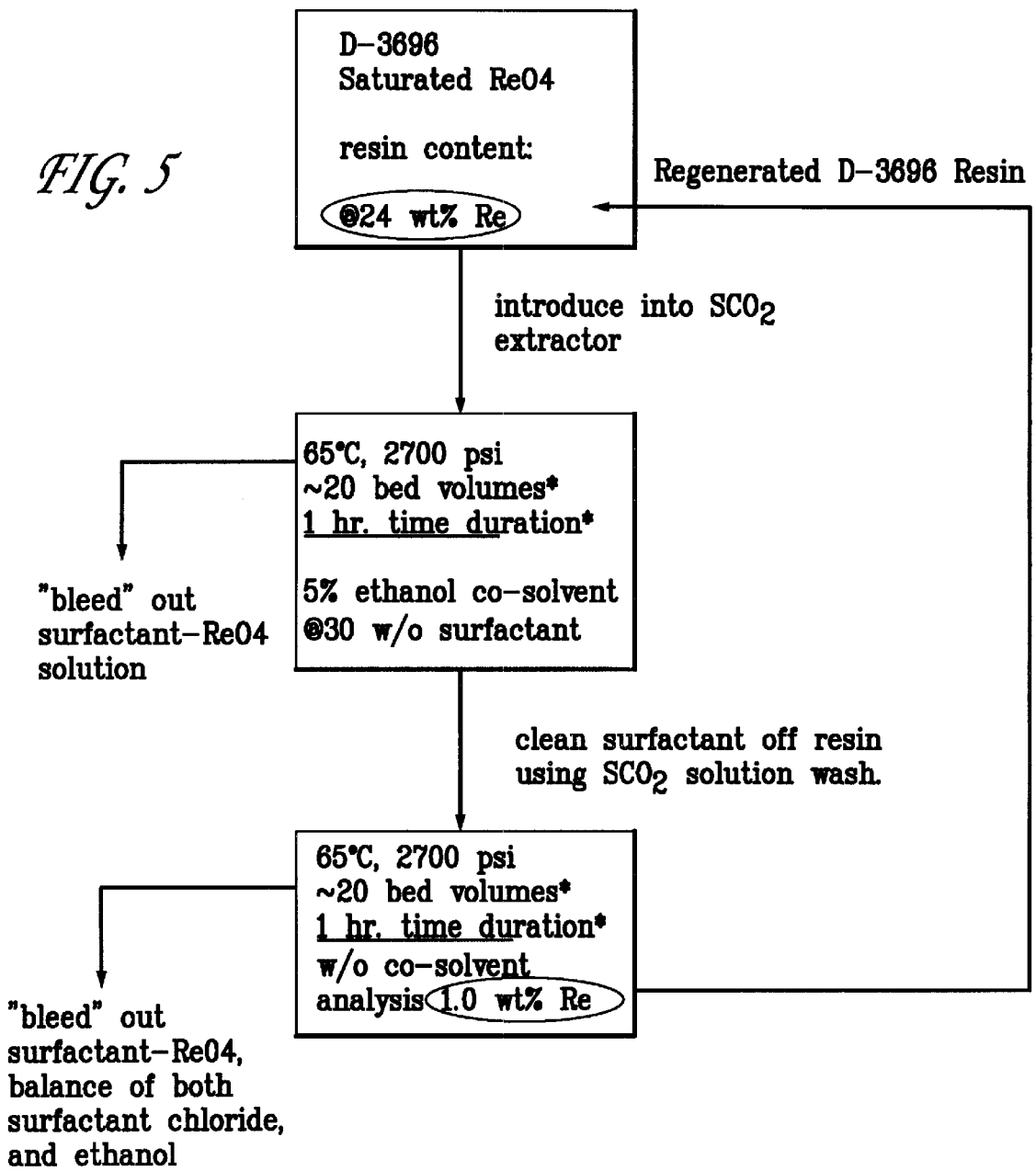
FIG. 5 illustrates a flow diagram of a batch supercritical $CO_2$ wash process for removing perchlorate from the resins.

A third embodiment teaches a batch supercritical $CO_2$ extraction rather than the continuous process of embodiment 1. As shown in FIG. 5, a block quantity of the "spent" resin 12 is removed form the exchange column and introduced into supercritical extractor vessel 40. This vessel is charged with a quantity of solution containing liquid carbon dioxide at a temperature of 65° C. and a pressure of 2700 psia, and co-solvents of ethanol and, in the particular example, the alkammonium chloride BTBAC (benztributyl ammonium chloride). The solution is allowed to remain in contact with the resin for about an hour at which point it is bled off and the $CO_2$ recovered while the perchlorate-laden liquor is discarded.

The process is repeated at least a second time using the same conditions and materials. Processed in this manner, a recovery rate of > than 96% was achieved within a total process time of under three hours.

SUMMARY

All three regeneration methods successfully removed perchlorate from the resin, with little difference in performance (Table 2). Regeneration times have not yet been optimized, but it seems likely that down selection will have to be made based on cost and impact analyses of the waste streams.

TABLE 2

Comparison of Regeneration Methods

| Method | Surfactant (g/g resin) | Ethanol (mL/g resin) | $CO_2$ or water (mL/g resin) | Time* (hours) | Capacity after regeneration** (mg $ClO_4^-$/g resin) |
|---|---|---|---|---|---|
| $SCO_2$ Flow | 5.3 | 12 | 68 | 6.7 | 50 ± 4 |
| Liquid Flow | 12 | 150 | 50 | 5 | 50 ± 10 |
| Liquid Batch | 12 | 150 | 50 | 24 | 70 ± 6 |

*These experiments are not optimized; amounts and times required could vary significantly from amounts and times used
**In flow experiments capacity is based on initial $ClO_4^-$ breakthrough To show that multiple regeneration experiments have no detrimental effect on perchlorate uptake, multiple contamination/regeneration cycling experiments were conducted in each type of experiment described above. In batch experiments, percentage of original uptake is used to compare cycles, while bed volumes to initial breakthrough are used to compare cycles in flow-through experiments. To compare flow-through uptake data to batch uptake data, relative uptake (mg $ClO_4^-$/g resin) at initial breakthrough is calculated.

Results of four batch regeneration experiments on uptake are shown in Table 3. Variations in efficiency from cycle to cycle, which are minor, may be due to minor differences in details such as water content variations in the resin during weighing. Significantly, there does not appear to be a systematic decrease in efficiency with cycling, i.e. the regeneration appears to have no detrimental effect on the resin's ability to remove perchlorate.

TABLE 3

Batch Cycling Efficiencies

| Uptake # | Relative Uptake, mg $ClO_4^-$/g resin | Regeneration Efficiency, %* | Distribution Coefficient, $K_d$ (mL/g) |
|---|---|---|---|
| 1 | 74.8 | — | 38.4 |
| 2 | 63.9 | 88 | 18.9 |
| 3 | 68.6 | 94 | 19.9 |
| 4 | 76.1 | 104 | 20.7 |
| 5 | 72.1 | 99 | 20.0 |

*Based on Uptake #1

Figure 7:
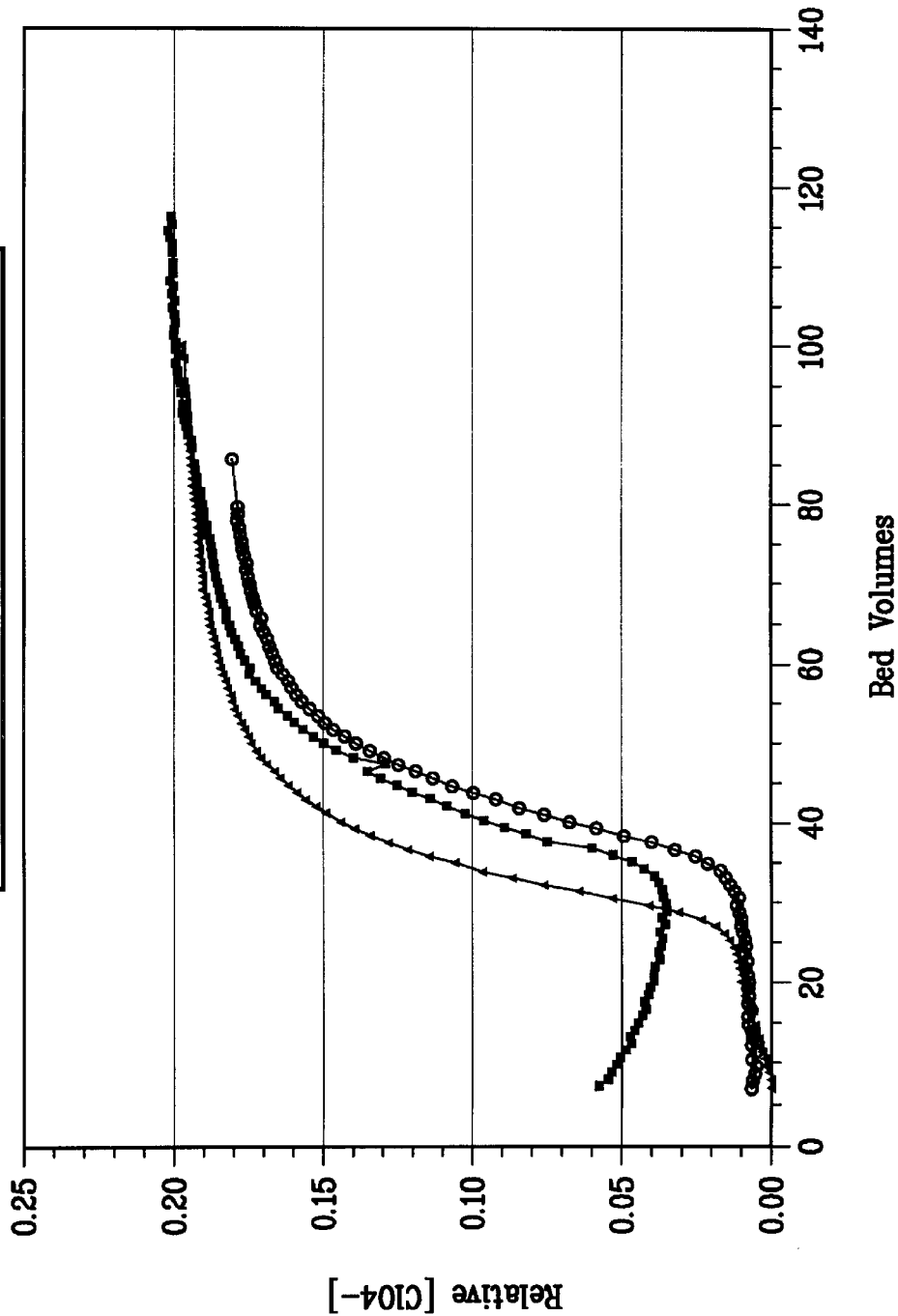
FIG. 7 illustrates regeneration cycling results where the carrier fluid is an aqueous solution.

To date, three liquid-phase flow-through regeneration cycles have been completed. Results of uptake experiments following those regeneration cycles are shown in FIG. 7. These cycling experiments show that, while bed volumes-to-initial breakthrough vary somewhat from cycle to cycle, there does not appear to be a systematic decrease in efficiency with cycling.

Flow-through regeneration experiments utilizing supercritical $CO_2$ have also been tested with multiple contamination/regeneration cycles. Just as in the liquid-phase flow-through cycling experiments, the supercritical $CO_2$ cycling experiments shown in FIG. 8, illustrate that the regeneration appears to have no detrimental effect on the resin's ability to remove perchlorate.

What is claimed is:
1. A process for regenerating an ion exchange resin, the process comprising the steps of:
   a) providing a quantity of an ion exchange resin, wherein said ion exchange resin comprises a polymer backbone having a plurality of reaction sites containing a chloride anion, and wherein at least some of said chloride anions at said reaction sites have been exchanged for a perchlorate anion;

b) creating a solution comprising liquid or supercritical carbon dioxide and at least one chloride containing surfactant compound, said surfactant compound comprising at least one chloride anion, said surfactant compound forming a more stable complex with said perchlorate anion then said perchlorate anion forms with said ion exchange resin reaction sites;

c) maintaining the temperature and pressure of said solution to maintain said carbon dioxide in a liquid phase;

d) contacting said ion exchange resin with said solution in order to bring said chloride anions contained therein into contact with said plurality of said reaction site and thereby provide for an exchange between said perchlorate anions for said surfactant chloride anions; and e) removing said solution and recovering said ion exchange resin.

2. The process of claim 1, further including the step of washing said recovered resin, said step of washing comprising washing said recovered resin with liquid or supercritical carbon dioxide.

3. The process of claim 1, wherein said ion exchange resin comprises a plurality of small particles.

4. The process of claim 3, wherein said particles are beads.

5. The process of claim 3, wherein said particles have a 3 dimensional shape selected from the group of 3 dimensional shapes consisting of spheres, rods, prismatic polyhedrons, and combinations of said 3 dimensional shapes.

6. The process of claim 1, wherein the chloride containing surfactant is an ammonium chloride salt.

7. The process of claim 6, wherein the ammonium chloride salt is a quaternary ammonium chloride salt.

8. The process of claim 7, wherein the quaternary ammonium chloride salt contains functional groups.

9. The process of claim 8, wherein the ammonium chloride salt is selected from the group consisting of benzyl dimethyl ammonium chloride, didecyl dimethyl ammonium chloride, n-alkyl(60% $C_{14}$, 25% $C_{12}$, 15% $C_{16}$)dimethyl benzyl ammonium chloride, n-alkyl(60% $C_{14}$, 30% $C_{16}$, 5% $C_{12}$, 5% $C_{18}$)dimethyl benzyl ammonium chloride, n-alkyl(68% $C_{12}$, 32% $C_{14}$)dimethyl ethbenzyl ammonium chloride, n-dialkyl(60% $C_{14}$, 30% $C_{16}$, 5% $C_{12}$, 5% $C_{18}$) methyl benzyl ammonium chloride, and combinations thereof.

10. The process of claim 1 wherein the surfactant is present in the solution up to a point at which said solution reaches saturation.

11. The process of claim 1 wherein the quantity of solution used to treat the resin is less than 40 bed volumes.

12. The process of claim 11, wherein the solution passes over and through the resin bed at about 1 bed volume every 3 minutes.

13. The process of claim 1, wherein, said alcohol has 2–4 carbon atoms per molecule.

14. The process of claim 13, wherein said alcohol is ethanol.

15. The process of claim 14, wherein the ethanol is present in the solution at a concentration from about 10 percent by weight to about a saturation limit.

16. A process for regenerating an ion exchange resin, the process comprising the steps of:

a) providing a quantity of an ion exchange resin, wherein said ion exchange resin comprises a polymer backbone having a plurality of reaction sites containing a chloride anion, and wherein at least some of said chloride anions at said reaction sites have been exchanged for a perchlorate anion;

b) creating a solution comprising water and at least one quaternary ammonium chloride surfactant compound, said compound further comprising at least one chloride anion;

c) contacting and stirring said ion exchange resin in said solution in order to bring said chloride anions contained therein into contact with said plurality of said reaction site and thereby provide for an exchange between said perchlorate anions for said surfactant chloride anions;

d) separating said solution from said ion exchange resin and repeating step c) at least once;

e) removing said solution and washing said ion exchange resin free of residual surfactant thereby providing a regenerated resin.

17. The process of claim 16, wherein said step of washing comprises washing with liquid or supercritical carbon dioxide.

18. The process of claim 16, wherein said resin comprises a plurality of small particles.

19. The process of claim 18, wherein said particles are beads.

20. The process of claim 18, wherein said particles have a 3 dimensional shape selected from the group of 3 dimensional shapes consisting of spheres, rods, prismatic polyhedrons, and combinations of said 3 dimensional shapes.

21. The process of claim 16, wherein the chloride containing surfactant is selected from the group consisting of benzyl dimethyl ammonium chloride, didecyl dimethyl ammonium chloride, n-alkyl(60% $C_{14}$, 25% $C_{12}$, 15% $C_{16}$) dimethyl benzyl ammonium chloride, n-alkyl(60% $C_{14}$, 30% $C_{16}$, 5% $C_{12}$, 5% $C_{18}$)dimethyl benzyl ammonium chloride, n-alkyl(68% $C_{12}$, 32% $C_{14}$)dimethyl ethbenzyl ammonium chloride, n-dialkyl(60% $C_{14}$, 30% $C_{16}$, 5% $C_{12}$, 5% $C_{18}$)methyl benzyl ammonium chloride, and combinations thereof.

22. The process of claim 16, wherein the surfactant is present in the solution in a weight ratio of between about 10 percent by weight to about 50 percent by weight.

23. The process of claim 22, wherein the quantity of solution used to treat the resin is less than 60 bed volumes.

24. The process of claim 23, wherein the solution is allowed to contact the resin for less than 24 hours.

25. The process of claim 16, wherein, said alcohol has 2–4 carbon atoms per molecule.

26. The process of claim 25, wherein said alcohol is ethanol.

27. The process of claim 26, wherein the ethanol is present in the solution at a concentration from about 10 percent by weight to about a saturation limit.

28. A process for regenerating an ion exchange resin, the process comprising the steps of:

a) providing a quantity of an ion exchange resin, wherein said ion exchange resin comprises a polymer backbone having a plurality of reaction sites containing a chloride anion, and wherein at least some of said chloride anions at said reaction sites have been exchanged for a perchlorate anion;

b) creating a solution comprising a simple alcohol and at least one chloride containing surfactant compound, said surfactant compound comprising at least one chloride anion, said surfactant compound forming a more stable complex with said perchlorate anion then said perchlorate anion forms with said ion exchange resin reaction sites;

c) contacting said ion exchange resin with said solution in order to bring said chloride anions contained therein into contact with said plurality of said reaction site and thereby provide for an exchange between said perchlorate anions for said surfactant chloride anions; and d) removing said solution and recovering said ion exchange resin.

29. The process of claim 28, wherein the chloride containing surfactant compound is an ammonium chloride salt.

30. The process of claim 29, wherein the ammonium chloride salt is a quaternary ammonium chloride salt.

31. The process of claim 30, wherein the quaternary ammonium chloride salt contains functional groups.

32. The process of claim 31, wherein the ammonium chloride salt is selected from the group consisting of benzyl dimethyl ammonium chloride, didecyl dimethyl ammonium chloride, n-alkyl(60% $C_{14}$, 25% $C_{12}$, 15% $C_{16}$)dimethyl benzyl ammonium chloride, n-alkyl(60% $C_{14}$, 30% $C_{16}$, 5% $C_{12}$, 5% $C_{18}$)dimethyl benzyl ammonium chloride, n-alkyl (68% $C_{12}$, 32% $C_{14}$)dimethyl ethbenzyl ammonium chloride, n-dialkyl(60% $C_{14}$, 30% $C_{16}$, 5% $C_{12}$, 5% $C_{18}$) methyl benzyl ammonium chloride, and combinations thereof.

33. The process of claim 28, wherein the surfactant is present in the solution up to a point at which said solution reaches saturation.

34. The process of claim 28, wherein the quantity of solution used to treat the resin is less than 40 bed volumes.

35. The process of claim 34, wherein the solution passes over and through the resin bed at about 1 bed volume every 3 minutes.

36. The process of claim 28, wherein the solution comprises a quantity of a simple alcohol, said alcohol having 2–4 carbon atoms per molecule.

37. The process of claim 36, wherein the alcohol is ethanol.

* * * * *